(12) United States Patent
Gale

(10) Patent No.: US 10,130,529 B2
(45) Date of Patent: Nov. 20, 2018

(54) APPARATUS FOR MOUNTING WHEELCHAIR SECUREMENT DEVICES TO EXISTING VEHICLE SEAT MOUNTING STRUCTURES

(71) Applicant: Indiana Mills & Manufacturing, Inc., Westfield, IN (US)

(72) Inventor: Steven Gale, Colfax, IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 0 days.

(21) Appl. No.: 15/434,278

(22) Filed: Feb. 16, 2017

(65) Prior Publication Data

US 2017/0231844 A1    Aug. 17, 2017

Related U.S. Application Data

(60) Provisional application No. 62/295,799, filed on Feb. 16, 2016.

(51) Int. Cl.
| | |
|---|---|
| *B60P 7/08* | (2006.01) |
| *A61G 3/08* | (2006.01) |
| *B60P 3/073* | (2006.01) |

(52) U.S. Cl.
CPC ............ *A61G 3/0808* (2013.01); *B60P 3/073* (2013.01)

(58) Field of Classification Search
CPC ......... A61G 3/0808; A61G 3/08; B60P 3/073; B60P 7/0815; B60P 7/0807
USPC ....... 410/7–12, 18, 19, 21–23, 30, 104, 105, 410/150; 297/DIG. 4; 296/65.04; 280/304.1
See application file for complete search history.

(56) References Cited

U.S. PATENT DOCUMENTS

| | | | | |
|---|---|---|---|---|
| 1,780,277 | A | * | 11/1930 | Seeley .................... B60P 3/073 |
| | | | | 410/8 |
| 4,257,644 | A | | 3/1981 | Stephens |
| 4,265,478 | A | | 5/1981 | Korsgaard |
| 4,464,089 | A | * | 8/1984 | Allen .................... B60P 7/0823 |
| | | | | 410/101 |

(Continued)

FOREIGN PATENT DOCUMENTS

| | | |
|---|---|---|
| EP | 0214838 A2 | 3/1987 |
| GB | 2130977 A | 6/1984 |
| GB | 2419572 A | 5/2006 |

*Primary Examiner* — Stephen T Gordon
(74) *Attorney, Agent, or Firm* — Barnes & Thornburg LLP

(57) ABSTRACT

An apparatus is provided for mounting at least one wheelchair securement devices to a pair of spaced-apart vehicle seat mounting structures each secured to and within an occupant transport vehicle and extending in a direction parallel to a direction of travel of the occupant transport vehicle. The apparatus includes an elongated support member extending transversely along a floor of the occupant transport vehicle between the vehicle seat mounting tracks, anchors coupled to opposite ends of the elongated support member and each releasably attachable to a different one of the vehicle seat mounting structures, and at least one wheelchair securement device secured to the elongated support member between the two anchors. In some embodiments, the at least one wheelchair securement device is slidably mounted to the elongated support member and selectively securable to and along the elongated support member between the two anchors.

20 Claims, 7 Drawing Sheets

(56) References Cited

U.S. PATENT DOCUMENTS

| | | | |
|---|---|---|---|
| 4,492,403 A | | 1/1985 | Blomgren et al. |
| 4,623,289 A | | 11/1986 | Apostolos |
| 4,688,843 A | | 8/1987 | Hall |
| 4,730,964 A | | 3/1988 | Joyner |
| 5,026,225 A | * | 6/1991 | McIntyre ............ A61G 3/0808 410/23 |
| 5,888,038 A | | 3/1999 | Ditch et al. |
| 6,113,325 A | | 9/2000 | Craft |
| 6,149,359 A | | 11/2000 | Cardona |
| 6,428,254 B2 | | 8/2002 | Craft |
| 6,524,039 B1 | | 2/2003 | Magnuson et al. |
| 6,698,983 B1 | | 3/2004 | Kieman et al. |
| 6,776,564 B1 | | 8/2004 | Kieman et al. |
| 6,899,497 B2 | | 5/2005 | Cardona et al. |
| 7,040,847 B1 | | 5/2006 | Cardona |
| 7,455,490 B1 | | 11/2008 | Goosen |
| 7,566,086 B2 | | 7/2009 | Gray et al. |
| 7,665,939 B1 | | 2/2010 | Cardona |
| 7,717,655 B2 | | 5/2010 | Cardona |
| 8,414,234 B2 | | 4/2013 | Girardin et al. |
| 2006/0249617 A1 | | 11/2006 | Cardona |
| 2009/0016836 A1 | | 1/2009 | Girardin et al. |

\* cited by examiner

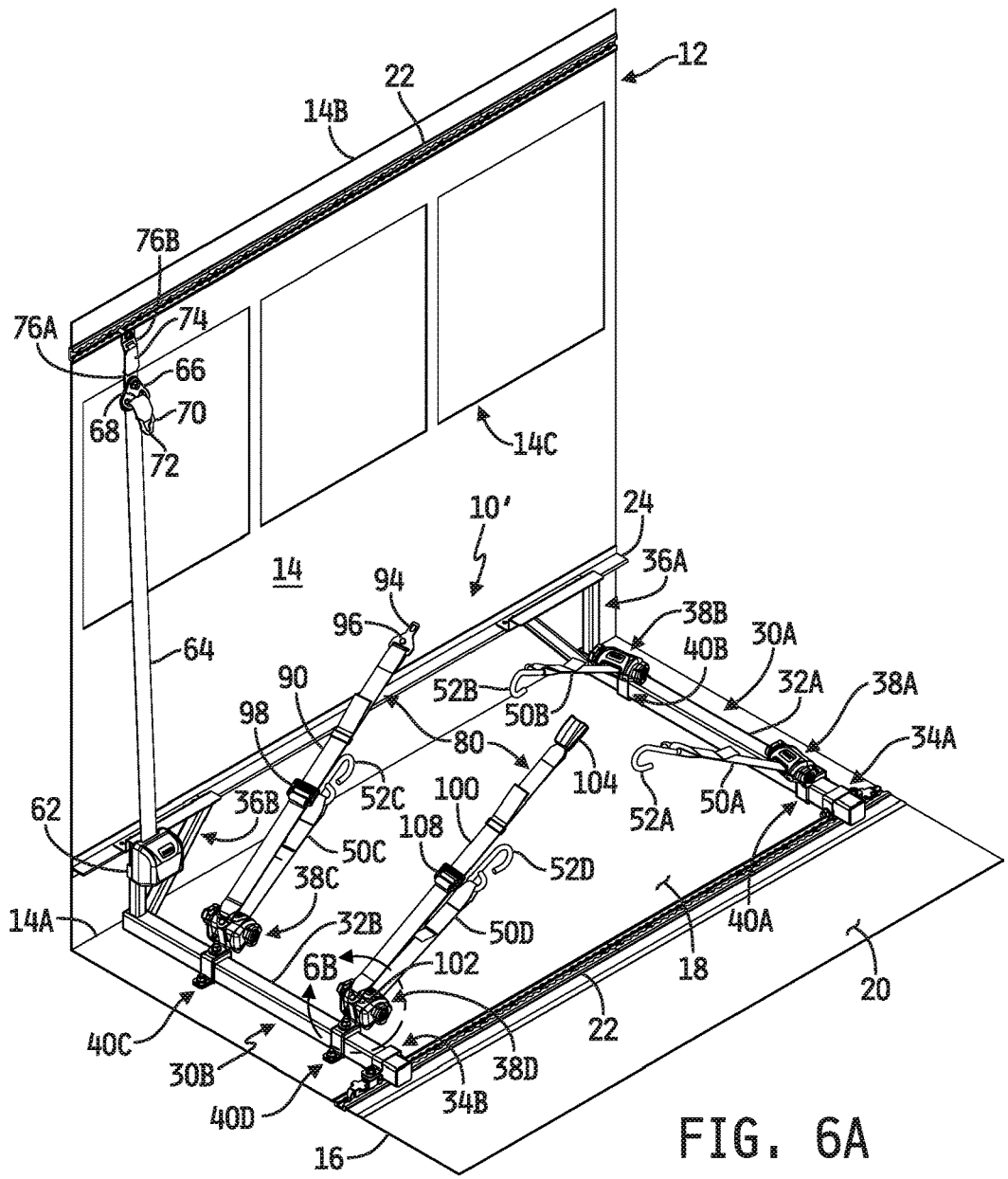
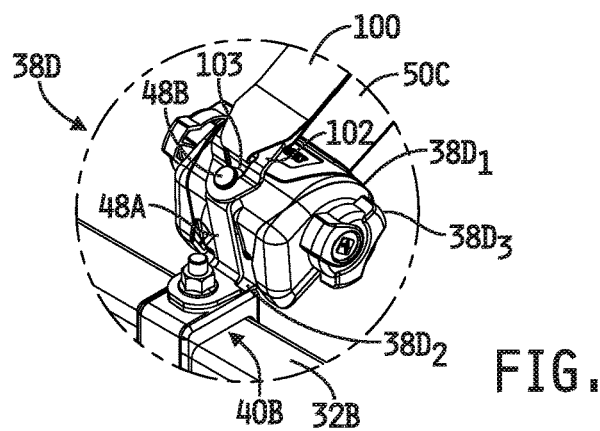
FIG. 6A
FIG. 6B

APPARATUS FOR MOUNTING WHEELCHAIR SECUREMENT DEVICES TO EXISTING VEHICLE SEAT MOUNTING STRUCTURES

CROSS-REFERENCE TO RELATED APPLICATION

This patent application claims the benefit of, and priority to, U.S. Provisional Patent Application Ser. No. 62/295,799, filed Feb. 16, 2016, the disclosure of which is incorporated herein by reference.

FIELD OF THE INVENTION

The present invention relates generally to apparatuses for securing wheelchair securement devices to or within occupant transport vehicles, and more specifically to such apparatuses for mounting wheelchair securement devices to existing vehicle seat mounting structures.

BACKGROUND

Some conventional occupant transport vehicles include vehicle seat mounting tracks for mounting occupant seats thereto. Some occupant transport vehicle configurations, for example, may include a pair of spaced-apart, elongated vehicle seat mounting tracks mounted in or to the floor of the occupant transport vehicle with the longitudinal axis of each track extending parallel to the direction of travel of the vehicle. Other example configurations may include a single such vehicle seat mounting track mounted in or to the floor of the occupant transport vehicle as just described, and another elongated vehicle seat track mounted to a side wall of the vehicle with the longitudinal axis thereof extending parallel to the direction of travel. In either configuration, one or more single and/or multiple-occupant seats may be mounted to and between each of the two vehicle seat mounting tracks.

In some such occupant transport vehicles, one or more seats may be temporarily removed to accommodate a wheelchair and occupant thereof. In conventional vehicles, two additional spaced-apart, elongated mounting tracks are typically mounted in or to the floor of the vehicle between the two vehicle seat mounting tracks described above, with the longitudinal axis of each additional mounting track extending parallel to the direction of travel of the vehicle. In such embodiments, two conventional wheelchair securement devices are typically secured between the rear of the wheelchair and two of the three or more floor-mounted tracks, and two conventional wheelchair securement devices are likewise typically secured between the front of the wheelchair and two of the three or more floor-mounted tracks. In such occupant transport vehicles, it would be desirable to eliminate the need for such additional mounting tracks while maintaining the ability to accommodate securement of one or more wheelchairs therein.

SUMMARY

The present invention may comprise one or more of the features recited in the attached claims, and/or one or more of the following features and combinations thereof. In one aspect, an apparatus is provided for mounting at least one wheelchair securement device to a pair of spaced-apart vehicle seat mounting structures configured for mounting at least one occupant seat thereto, each of the vehicle seat mounting structures secured to and within an occupant transport vehicle and extending in a direction parallel to a direction of travel of the occupant transport vehicle. The apparatus may comprise a first elongated support member extending transversely along a floor of the occupant transport vehicle between the pair of vehicle seat mounting tracks, a first anchor coupled to one end of the first elongated support member and releasably attachable to one of the pair of spaced-apart vehicle seat mounting structures, a second anchor coupled to an opposite end of the first elongated support member and releasably attachable to the other of the pair of spaced-apart vehicle seat mounting structures, and a first wheelchair securement device secured to the first elongated support member between the first and second anchors.

In another aspect, an apparatus is provided for mounting at least one wheelchair securement device to a pair of spaced-apart vehicle seat mounting structures configured for mounting at least one occupant seat thereto, each of the vehicle seat mounting structures secured to and within an occupant transport vehicle and extending in a direction parallel to a direction of travel of the occupant transport vehicle. The apparatus may comprise an elongated support member extending transversely along a floor of the occupant transport vehicle between the pair of vehicle seat mounting tracks, a first anchor coupled to a first end of the elongated support member and releasably attachable to one of the pair of spaced-apart vehicle seat mounting structures, a second anchor coupled to a second end of the elongated support member opposite the first end thereof and releasably attachable to the other of the pair of spaced-apart vehicle seat mounting structures, a first wheelchair securement device, a second wheelchair securement device, a first bracket coupled to the first wheelchair securement device and slidably mounted to the elongated support member, a second bracket coupled to the second wheelchair securement device and slidably mounted to the elongated support member, the first bracket slidable along the elongated support member between the first anchor and the second bracket, and the second bracket slidable along the elongated support member between the second anchor and the first bracket, means for securing the first bracket to the elongated support member at a selected position between the first anchor and the second bracket, and means for securing the second bracket to the elongated support member at a selected position between the second anchor and the first bracket.

BRIEF DESCRIPTION OF THE DRAWINGS

This disclosure is illustrated by way of example and not by way of limitation in the accompanying figures. Where considered appropriate, reference labels have been repeated among the Figure to indicate corresponding or analogous elements.

FIG. 6A is a perspective view of another embodiment of the apparatus of FIGS. 1-5 shown from the same perspective as that of FIG. 1 and further illustrating a wheelchair occupant restraint system coupled to the rear wheelchair securement devices.

FIG. 6B is a magnified view of a portion of the portion 6B of the apparatus identified in FIG. 6A.

DETAILED DESCRIPTION OF THE DRAWINGS

Figure 1:
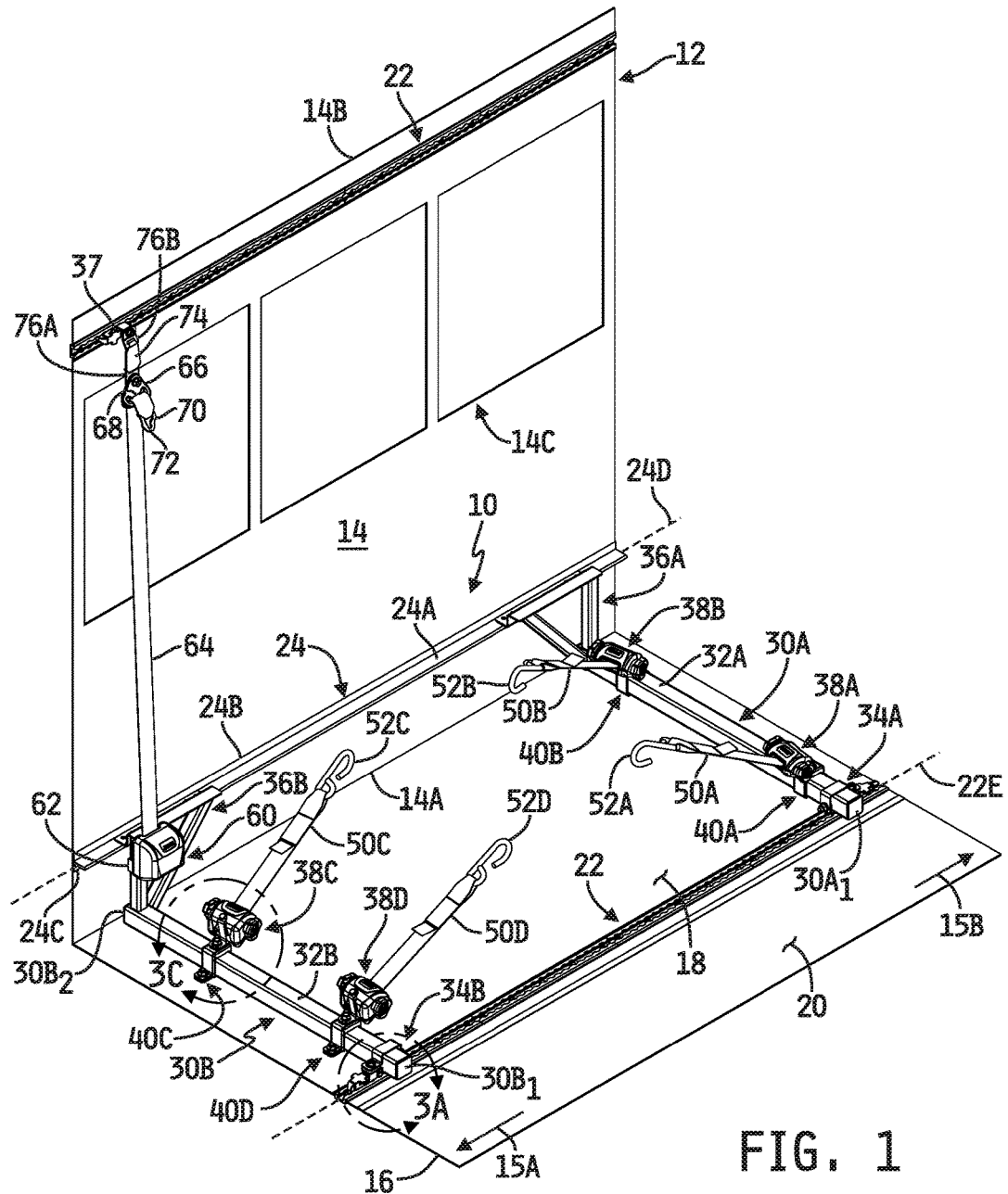
FIG. 1 is a perspective view of an embodiment of an apparatus for mounting wheelchair securement devices to existing vehicle seat mounting tracks, wherein the perspective view illustrated in FIG. 1 is from a position forward of the apparatus relative to an occupant transport vehicle in which the apparatus is mounted.

While the concepts of the present disclosure are susceptible to various modifications and alternative forms, specific exemplary embodiments thereof have been shown by way of example in the drawing and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases may or may not necessarily refer to the same embodiment. Further, when a particular feature, structure or characteristic is described in connection with an embodiment, it is submitted that it is within the knowledge of one skilled in the art to effect such feature, structure or characteristic in connection with other embodiments whether or not explicitly described. Further still, it is contemplated that any single feature, structure or characteristic disclosed herein may be combined with any one or more other disclosed feature, structure or characteristic, whether or not explicitly described, and that no limitations on the types and/or number of such combinations should therefore be inferred.

Referring now to FIGS. 1-3C, an embodiment is shown of an apparatus 10 for mounting wheelchair securement devices to existing vehicle seat mounting tracks, i.e., tracks attached to or integral with an occupant transport vehicle and structurally designed to mount and secure one or more conventional occupant seats thereto. In the illustrated embodiment, a portion of an example occupant transport vehicle 12 is shown in which the apparatus 10 is mounted. In one example embodiment, which should not be considered limiting in any way, the occupant transport vehicle 12 is a bus, motor coach, van or other occupant transport vehicle in which a plurality of single-occupant and/or multiple-occupant seats are mounted in the form of at least one column seats with one seat positioned behind another, and in which at least one such occupant seat can be removed, at least temporarily, to accommodate a conventional wheelchair in the space vacated by the at least one seat. Those skilled in the art will recognize other occupant transport vehicle examples which may be configured to accommodate at least one wheelchair therein, and it will be understood that any such other occupant transport vehicles are contemplated by this disclosure.

In the illustrated embodiment, the occupant transport vehicle 12 includes a sidewall 14 having a bottom end 14A defining an interface with a floor 16 of the vehicle 12 and a top end 14B opposite the bottom end 14A. In some embodiments, the sidewall 14 may include one or more windows 14C between the bottom end 14A and the top end 14B and spaced apart from the bottom end 14A so as to provide viewing therethrough by an occupant seated in an occupant seat or wheelchair. The floor 16 illustratively includes an occupant seat mounting portion 18 and an aisle portion 20, wherein the occupant seat mounting portion 18 is positioned between the sidewall 14 and the aisle 20. In the illustrated example occupant transport vehicle 12, conventional occupant seats are typically positioned one behind the other in the occupant seat mounting portion such that the front, occupant-supporting portions of such seats face toward a front of the vehicle 12, e.g., as indicated by the arrow 15A, and such that the rear portions of such seats face toward a rear of the vehicle 12, e.g., as indicated by the arrow 15B. Illustratively, the arrows 15A and 15B also represent the direction(s) of travel of the occupant transport vehicle 12, with the arrow 15A representing the direction of forward travel of the vehicle 12 and with the arrow 15B representing the direction of backward travel of the vehicle 12. In some embodiments, the occupant transport vehicle 12 may include another occupant seat mounting portion 18 on an opposite side of the aisle 20 from the occupant seat mounting portion 18 illustrated in FIGS. 1 and 2.

Occupant seats mountable within the occupant seat mounting portion 18 typically include a frame that is securable at or near opposite sides thereof to the occupant transport vehicle 12 via conventional vehicle seat mounting tracks. In the illustrated example occupant transport vehicle 12, such conventional vehicle seat mounting tracks are typically provided in the form of spaced-apart, elongated vehicle seat mounting tracks, each of which extend along a longitudinal axis that is parallel with the forward/reverse directions of travel 15A, 15B of the vehicle 12. In the embodiment illustrated in FIGS. 1 and 2, such spaced-apart, elongated vehicle seat mounting tracks are implemented in the form of a so-called "aisle-side" vehicle seat mounting track 22, illustratively mounted within the occupant seat mounting portion 18 to the floor 16 of the vehicle 12 adjacent to the aisle 20, and a so-called "wall-side" vehicle seat mounting track or rail 24, illustratively mounted to the sidewall 14 of the vehicle 12 and spaced apart from the occupant seat mounting portion 18 of the floor 16.

Figure 3A:
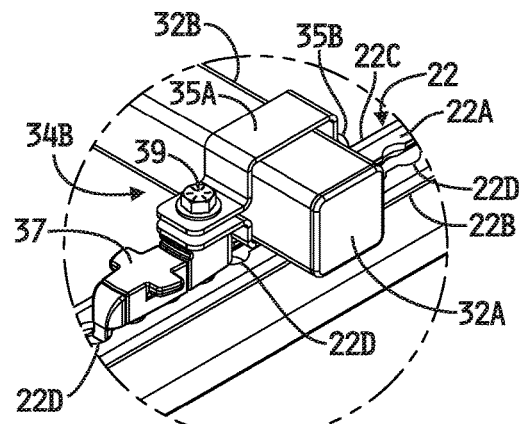
FIG. 3A is a magnified view of the portion 3A of the apparatus identified in FIG. 1.

As illustrated most clearly in FIG. 3A, the vehicle seat mounting track 22 illustratively defines a top surface 24A between two opposing sides 22B, 22C, and a bottom surface (not shown) opposite the top surface 24A secured to the floor 16 of the vehicle 12 in a conventional manner. The top surface 22A illustratively defines therein a number of bores or wells 22D which are aligned with each other and which extend sequentially along the length of the track 22. Such bores or wells 22D are illustratively configured to engage a conventional seat mounting post or stud affixed to or integral with a base frame or leg of a conventional occupant seat such that the occupant seat is secured to the track 22 in a conventional manner. The track 22 may be a unitary piece extending along a portion of, or along the length of, the floor 16, or may instead include multiple pieces arranged end-to-end. As illustrated in FIG. 1, the elongated seat mounting track 22 defines a longitudinal axis 22E therethrough which is generally parallel with and to the directions 15A, 15B of vehicle travel and, in the illustrated embodiment, generally parallel with the aisle 16 and the interface between the bottom 14A of the wall 14 and the floor 16.

Figure 2:
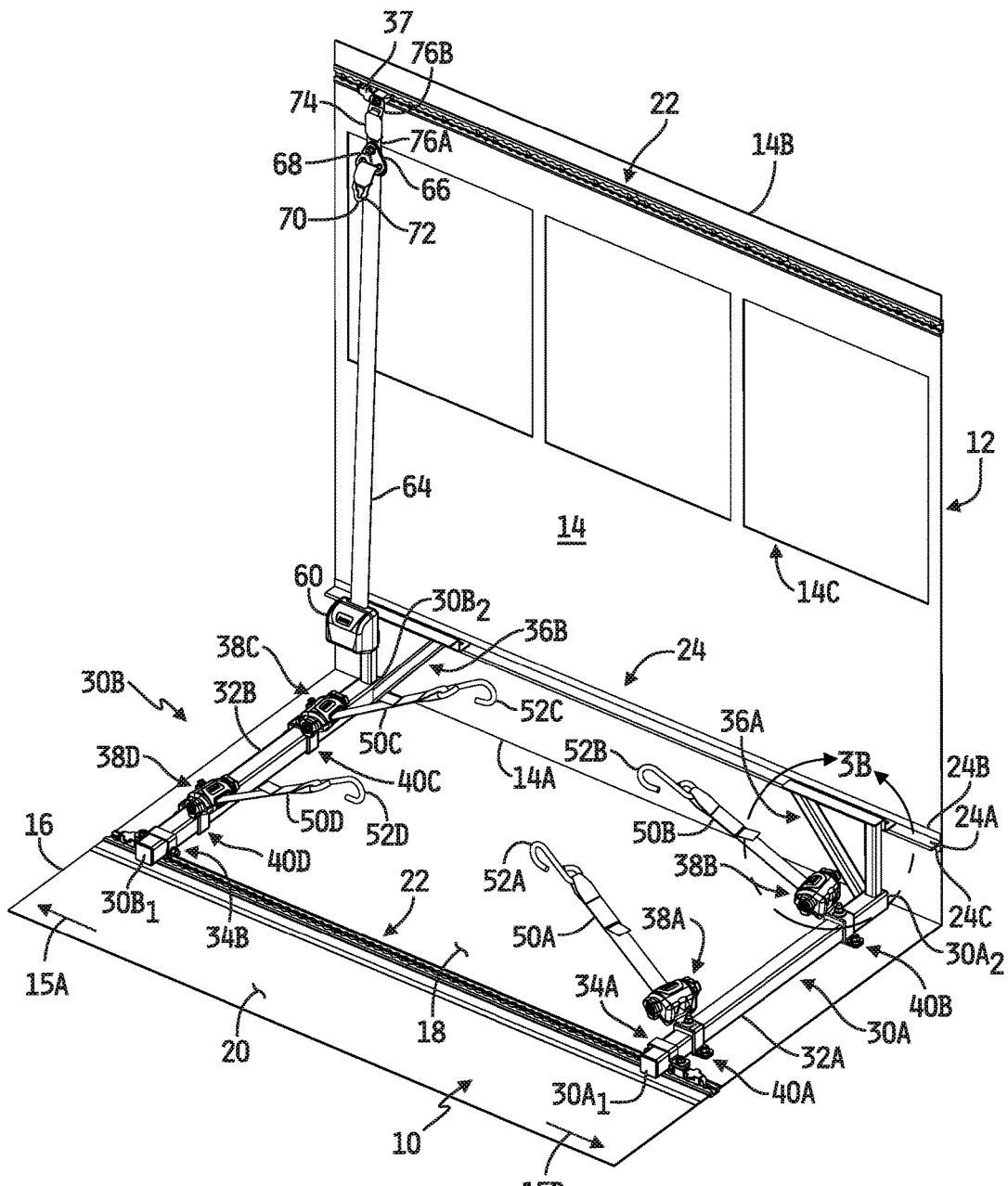
FIG. 2 is another perspective view of the embodiment of the apparatus illustrated in FIG. 1, wherein the perspective view illustrated in FIG. 2 is from a position rearward of the apparatus relative to the occupant transport vehicle in which the apparatus is mounted.
Figure 3B:
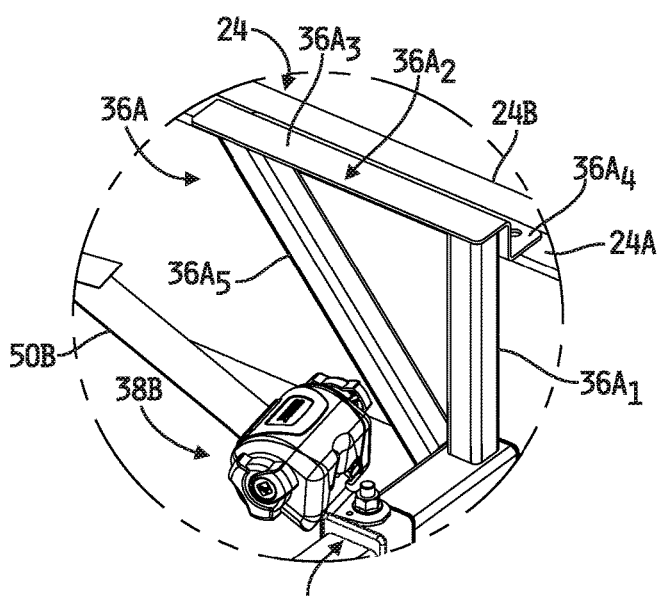
FIG. 3B is a magnified view of the portion 3B of the apparatus identified in FIG. 2.

As illustrated most clearly in FIGS. 1, 2 and 3B, the vehicle seat mounting track 24 illustratively defines an elongated plate 24A extending generally perpendicularly away from the inner surface of the sidewall 14, an elongated upper flange 24B extending upwardly from and generally perpendicular to a top surface of the plate 24A and an elongated lower flange 24C extending downwardly from and generally perpendicular to a bottom surface of the plate 24A. The flanges 24B, 24C may be integral with the plate 24 or may instead be attached thereto. In any case, backside surfaces of the flanges 24B, 24C are mounted and secured to the sidewall 14 in a conventional manner such that a longitudinal axis 24D defined through the track 24 is generally parallel with and to the vehicle seat mounting track 22, and positioned along the sidewall 24 such that the planar top surface of the plate 24A is spaced apart from the interface defined between the bottom 14A of the sidewall 14 and the floor 16. In some embodiments, the plate 24A illustratively defines therein a number of bores or therethrough (not shown) which extend sequentially along the length of the track 24, wherein such bores are illustratively configured to align with complementary bores defined through a base frame or mounting bracket of a conventional occupant seat such that the occupant seat can be secured to the track 24 in a conventional manner, e.g., using any number of conventional fixation elements. The track 24 may be a unitary piece extending along a portion of, or along the length of, the sidewall 14, or may instead include multiple pieces arranged end-to-end.

In the embodiment illustrated in FIGS. 1 and 2, it will be appreciated that the occupant seat mounting portion 18 of the floor 16 is sized to accommodate at least one conventional occupant seat mounted to an between the vehicle seat mounting tracks 22, 24. At least one such conventional occupant seat may have been previously mounted to and between each of the vehicle seat mounting tracks 22, 24 within the occupant seat mounting portion 18 of the floor 16, and in such a case the occupant seat has been removed in the illustrated embodiment in order to accommodate mounting of the apparatus 10 as illustrated in FIGS. 1-3C.

It will be understood that the vehicle seat mounting tracks 22, 24 represent pre-existing vehicle seat mounting tracks in that such tracks 22 and 24 are integral with or mounted to and within the occupant transport vehicle 12 for the purpose of mounting one or more occupant seats thereto (not shown) as described above, and that one or more such seats mounted thereto will be removed in order to accommodate mounting of the apparatus 10 therein as will be described below.

The apparatus 10 is illustratively provided to secure a wheelchair to, and restrain the wheelchair relative to, the vehicle 12 within the occupant seat mounting portion 18, e.g., with one or more vehicle occupant seats having been first removed. In some embodiments, the apparatus 10 is configured to secure and restrain a wheelchair positioned within the occupant seat mounting portion 18 with a rear of the wheelchair facing in the forward direction of vehicle travel 15A and with the front of the wheelchair facing in the reverse direction of vehicle travel 15B, e.g., such that the wheelchair occupant is rear-facing, and for purposes of this document the various embodiments of the wheelchair securement mounting apparatus will be described as such. It will be understood, however, that in alternate embodiments the wheelchair may be forward-facing, i.e., such that the rear of the wheelchair faces the reverse direction of vehicle travel 15B and the front of the wheelchair faces the forward direction of travel 15A, and in such alternate embodiments those skilled in the art will recognize that modifications of and to any of the various embodiments of the wheelchair securement mounting apparatus necessary to accommodate such implementations would be a mechanical step for a skilled artisan.

In the illustrated embodiment, the apparatus 10 includes a "front" wheelchair securement assembly 30A mounted and secured to and between the vehicle seat mounting tracks 22, 24, and a "rear" wheelchair securement assembly 30B mounted and secured to and between the vehicle seat mounting tracks 22, 24 forwardly of and spaced apart from the wheelchair securement assembly 30A. As is conventional and as will be described in greater detail hereinafter, the "rear" wheelchair securement assembly 30B may illustratively include one or more restraint structures configured specifically to engage and secure rear portions of a rear-facing wheelchair to the vehicle seat mounting tracks 22, 24 and/or to engage and secure one or more structures of or attached to the wheelchair from the rear of the wheelchair, and the front wheelchair securement assembly 30A illustratively includes structures configured to engage and secure front portions of the rear-facing wheelchair to the vehicle seat mounting tracks 22, 24. Thus, in the context of a rear-facing wheelchair positioned within the space 18, the wheelchair securement assembly 30A is referred to as the "front" wheelchair securement assembly even though it is positioned rearwardly of the assembly 30B, and the wheelchair securement assembly 30B is referred to as the "rear" wheelchair securement assembly even though it is positioned forwardly of the assembly 30A.

The front wheelchair securement assembly 30A illustratively includes an elongated support member 32A, e.g., tube, rail or the like, extending transversely along the floor 16 of the vehicle 12 between the vehicle seat mounting tracks 22, 24. In the illustrated embodiment, the elongated support member 32A is a tube having a square cross-section, although it will be understood that in other embodiments the cross-section of the elongated support member 32A may have other shapes. One end $30A_1$ of the elongated support member 32A is illustratively secured to the vehicle seat mounting track 22 via an anchor device 34A attached to, e.g., clamped or otherwise mounted to, the elongated support member 32A at or near the one end $32A_1$ thereof, and an opposite end $32A_2$ of the elongated support member 32A is illustratively secured to the vehicle seat mounting track 24 via another anchor device 36A attached or otherwise mounted to the elongated support member 32A at or near the opposite end $32A_2$. In the illustrated embodiment, the rear wheelchair securement assembly 30B is identically as described with respect to the front wheelchair securement assembly 30A in that the rear wheelchair securement assembly 30B includes an elongated support member 32B extending transversely along the floor 16 of the vehicle 12 between the vehicle seat mounting tracks 22, 24 and secured to the track 22 at or near one end $32B_1$ thereof by an anchor device 34B and secured to the track 24 at or near an opposite end $32B_2$ thereof by another anchor device 36B, wherein the anchor devices 34A, 34B are identical and the anchor devices 36A, 36B are also identical. In some alternate embodiments, one or more components of the rear wheelchair securement assembly 30B may be different from one or more corresponding components of the front wheelchair securement assembly 30A.

Referring now to FIG. 3A, a magnified view is shown of the anchor device 34B, a portion of the vehicle seat mounting track 22 and a portion of the elongated support member 32B. In the illustrated embodiment, the anchor device 34B illustratively includes a collar or bracket 35A which extends about the elongated support member 32B and which illustratively defines a pair of opposed flanges defining an opening to the bracket 35A about which the cross-sectional area of the bracket 35A may be varied. A fixation member 39, e.g., a threaded bolt, is passed through the flanges of the bracket 35A to secure the bracket 35A to a conventional mounting anchor 37, e.g., in the form of a post or stud, that is configured to engage one or more of the bores or wells 22D of the vehicle seat mounting track 22 in a conventional manner to secure the mounting anchor 37, and thus the bracket 35A, to the vehicle seat mounting track 22. In some embodiments, the clamping force of the bracket 35A about the elongated support member 32B may be sufficient to secure the bracket 35A to the elongated support member 32B and prevent, or at least minimize, translation of the bracket 35A longitudinally along the elongated support member 32B. In other embodiments, such as illustrated in FIG. 3A, a set screw or bolt 35B may be passed through the bracket 35A to engage the surface of the elongated support member 32B to prevent, or at least minimize, movement of the bracket 35A relative to the elongated support member 32B. The anchor device 34A is, in the illustrated embodiment, identical to the anchor device 34B, and attaches to and between the elongated support member 32A and the vehicle seat mounting track 22 identically as just described with respect to the anchor device 34B.

Referring now to FIG. 3B, a magnified view is shown of the anchor device 36A, a portion of the vehicle seat mounting track 24 and a portion of the elongated support member 32A. In the illustrated embodiment, the anchor device 36A illustratively includes an elongated mounting bracket $36A_2$ having one end affixed to or integral with a bracket support leg $36A_1$ and having an opposite end affixed to or integral with another bracket support leg $36A_5$. The elongated mounting bracket $36A_2$ is illustratively stair-stepped along its length, and ends of the bracket support legs $36A_1$ and $36A_5$ are illustratively attached to or integral with an upper step $36A_3$. In the illustrated embodiment, opposite ends of the bracket support legs $36A_1$ and $36A_5$ are affixed to or integral with the elongated support member 32A at or adjacent to the end of the elongated support member 32A. In alternate embodiments, the bracket support legs $36A_1$ and $36A_5$ may be detachably mounted to the elongated support member 32A at or adjacent to the end thereof. In the illustrated embodiment, the elongated mounting bracket $36A_2$ is positioned by the bracket support legs $36A_1$ and $36A_5$ such that at least the lower step $36A_4$ of the elongated mounting bracket $36A_2$ is parallel with and contacting the top surface of the plate 24A. In the illustrated embodiment, the bracket support leg $36A_1$ extends perpendicularly between the elongated support member 32A and the elongated mounting bracket $36A_2$, and the bracket support leg $36A_5$ extends diagonally between the elongated support member 32A and the elongated mounting bracket $36A_2$, although in other embodiments the either or both of the bracket support legs $36A_1$ and $36A_5$ may be differently oriented. In the illustrated embodiment, the elongated mounting bracket $36A_2$ acts as a track or rail mounting portion of the anchor 36A and the bracket support legs $36A_1$ and $36A_5$ act as a riser portion appropriately positioning the track or rail mounting portion relative to the vehicle seat mounting track 24. In any case, in the illustrated embodiment the lower step $36A_4$ illustratively defines one or more bores therethrough which align(s) with one or more corresponding bores defined through the plate 24A, and one or more conventional fixation members may be received within such aligned bores to secure the elongated mounting bracket $36A_2$ to the plate 24A of the vehicle seat mounting track 24. The anchor device 36B is, in the illustrated embodiment, identical to the anchor device 36A, and attaches to and between the elongated support member 32B and the vehicle seat mounting track 24 identically as just described with respect to the anchor device 36A.

Between the anchor devices 34A, 36A and 34B, 36B, and thus between the vehicle seat mounting tracks 22, 24, at least one wheelchair securement device is mounted to each of the elongated support members 32A, 32B. In the illustrated embodiment, two such wheelchair securement devices 38A, 38B are mounted to the elongated support member 32A in spaced-apart relationship, and two wheelchair securement devices 38C, 38D are likewise mounted, in spaced-apart relationship, to the elongated support member 32B. It will be understood, however, that in alternate embodiments more or fewer such wheelchair securement devices may be mounted to and along either or both of the elongated support members 32A, 32B between the two anchors 34A, 36A and 34B, 36B respectively. In the illustrated embodiment, each of the wheelchair securement devices 38A, 38B, 38C, 38D is illustratively identical to the others, although in other embodiments at least one of the wheelchair securement devices 38A-38D may be different from others of the wheelchair securement devices 38A-38D.

Each wheelchair securement device 38A, 38B, 38C, 38D is illustratively mounted to, and may be secured in place relative to, a corresponding one of the elongated support members 32A, 32B by a corresponding mounting bracket 40A, 40B, 40C, 40D. One end of a restraint web, tether or belt 50A, 50B, 50C, 50D is coupled, e.g., attached or otherwise secured to, a respective one of the wheelchair securement devices 38A, 38B, 38C, 38D, and a wheelchair engagement member 52A, 52B, 52C, 52S, e.g., a hook or other wheelchair engagement member, configured to releasably engage, i.e., to releasably attach to, one or more components of a conventional wheelchair. The wheelchair securement devices 38A-38D are illustratively conventional in that each device 38A-38D is configured to selectively pay out and retract a corresponding one of the restraint webs 50A-50D.

Figure 3C:
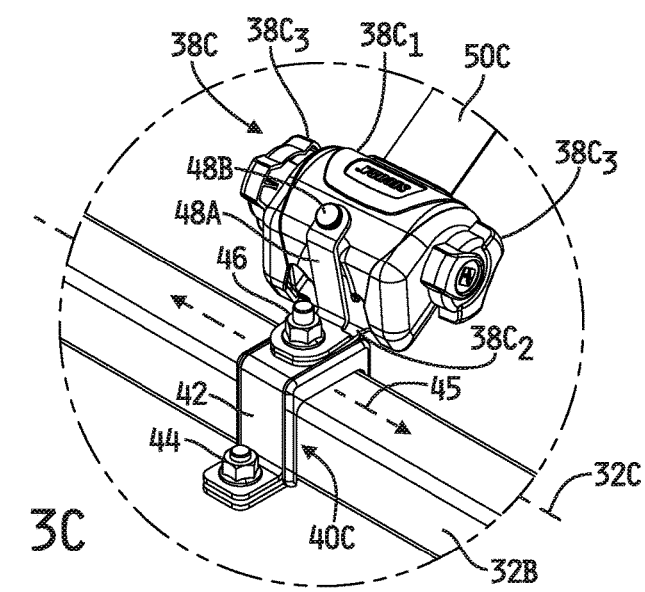
FIG. 3C is a magnified view of the portion 3C of the apparatus identified in FIG. 1.

Referring now to FIG. 3C, a magnified view is shown of the wheelchair securement device 38C, a portion of the restraint web 50C extending from the wheelchair securement device 38C, the corresponding wheelchair securement device mounting bracket 40C, and a portion of the elongated support member 32B to which the mounting bracket 40C is mounted. In the illustrated embodiment, the wheelchair securement device 38C illustratively includes a housing $38C_1$ which carries conventional web retracting and payout structures, such as a spool about which the restraint web 50C is wound, and one or more web locking structures for preventing web payout under locked conditions. The housing $38C_1$ is affixed or attached to a securement device frame $38C_2$, and the web securement device 38C illustratively includes one or more manually actuatable web retracting and/or payout actuators 38C$_3$, e.g., knob(s), extending from either or both sides of the housing 38C$_1$, whereby the web 50C may be manually retracted within the housing 38C$_1$ and/or may manually paid out of the housing 38C$_1$, when the web is not locked, by suitably rotating knob(s) 38C$_3$.

In the illustrated embodiment, the mounting bracket 40C illustratively includes a collar or bracket 42 which extends about the elongated support member 32B and which illustratively defines a pair of opposed flanges defining an opening to the bracket 42 about which the cross-sectional area of the bracket 42 may be varied. A fixation member 44, e.g., a threaded bolt, is passed through the flanges of the bracket 42 to secure, e.g., clamp, the bracket 42 to the elongated support member 32B. The frame 38C$_2$ of the wheelchair securement device 38C is illustratively mounted to the collar or bracket 42 by a conventional fixation member 46, e.g., threaded bolt and nut arrangement. In some embodiments, e.g., in embodiments in which a wheelchair occupant restraint web may be coupled to the wheelchair securement device 38C, the wheelchair securement device 38C illustratively includes a wheelchair occupant restraint web attachment bracket 48A mounted to the frame 38C$_2$, e.g., via the fixation member 46, wherein the bracket 48A illustratively defines a conventional restraint web retaining post 48B at one end thereof. It will be understood that in embodiments which do not include a wheelchair occupant restraint web coupled to the wheelchair securement device 38C, the bracket 48A may be omitted.

In some embodiments, the wheelchair securement device mounting brackets 40A-40C are intended to be mounted in a fixed positioned inboard of the anchor devices 34A, 36A and 34B, 36B. In such embodiments, the fixation member 44 may be suitable capped or otherwise rendered inaccessible or non-actuatable. Alternatively, the fixation member 44 may be accessible and/or actuatable only with a conventional or custom tool. In other embodiments, one or more of the wheelchair securement device mounting brackets 40A-40C is/are intended to be movably positionable along the respective elongated support member 32A, 32B. In such embodiments, each such bracket 40A-40C may be loosened, e.g., via actuation of the fixation member 44, then slidable along the elongated support members 32A, 32B, e.g., in either direction 45 parallel with the longitudinal axis 32C defined through the elongated support member 32B as illustrated in FIG. 3C, to a desired position relative to the corresponding elongated support member 32A, 32B, and then tightened, e.g., via action of the fixation member 44, to secure the corresponding bracket 40A-40C in the desired position to the corresponding elongated support member 32A, 32B. The mounting bracket 40C is, in the illustrated embodiment, identical to the mounting brackets 40A, 40B and 40D, and in the illustrated embodiment the mounting brackets 40A, 40B and 40D attach to the elongated support members 32A, 32B identically as just described with respect to the mounting bracket 40C.

In some such embodiments, one or more of the brackets 40A-40C may be freely slidable, when appropriately loosened, along the corresponding elongated support member 32A, 32B. Alternatively or additionally, one or more of the brackets 40A-40C and/or the corresponding elongated support member 32A, 32B may include a conventional detent or other conventional mechanism via which the bracket(s) 40A-40C may be discretely positionable along the corresponding elongated support member(s) 32A, 32B. In still other embodiments, one or more of the brackets 40A-40C may be replaced with a lockable translation structure guidable along the corresponding elongated support member(s) 32A, 32B, e.g., along the surface of the elongated support member(s) 32A, 32B or along a groove or channel defined therein, to a desired position at which the structure may be locked and secured in place. Those skilled in the art will recognize other structures and/or techniques for movably positioning and securing one or more of the wheelchair securement devices 38A-38D along and to the corresponding elongated support members 32A, 32B, and it will be understood that any such other structures and/or techniques are contemplated by this disclosure.

Figure 4:
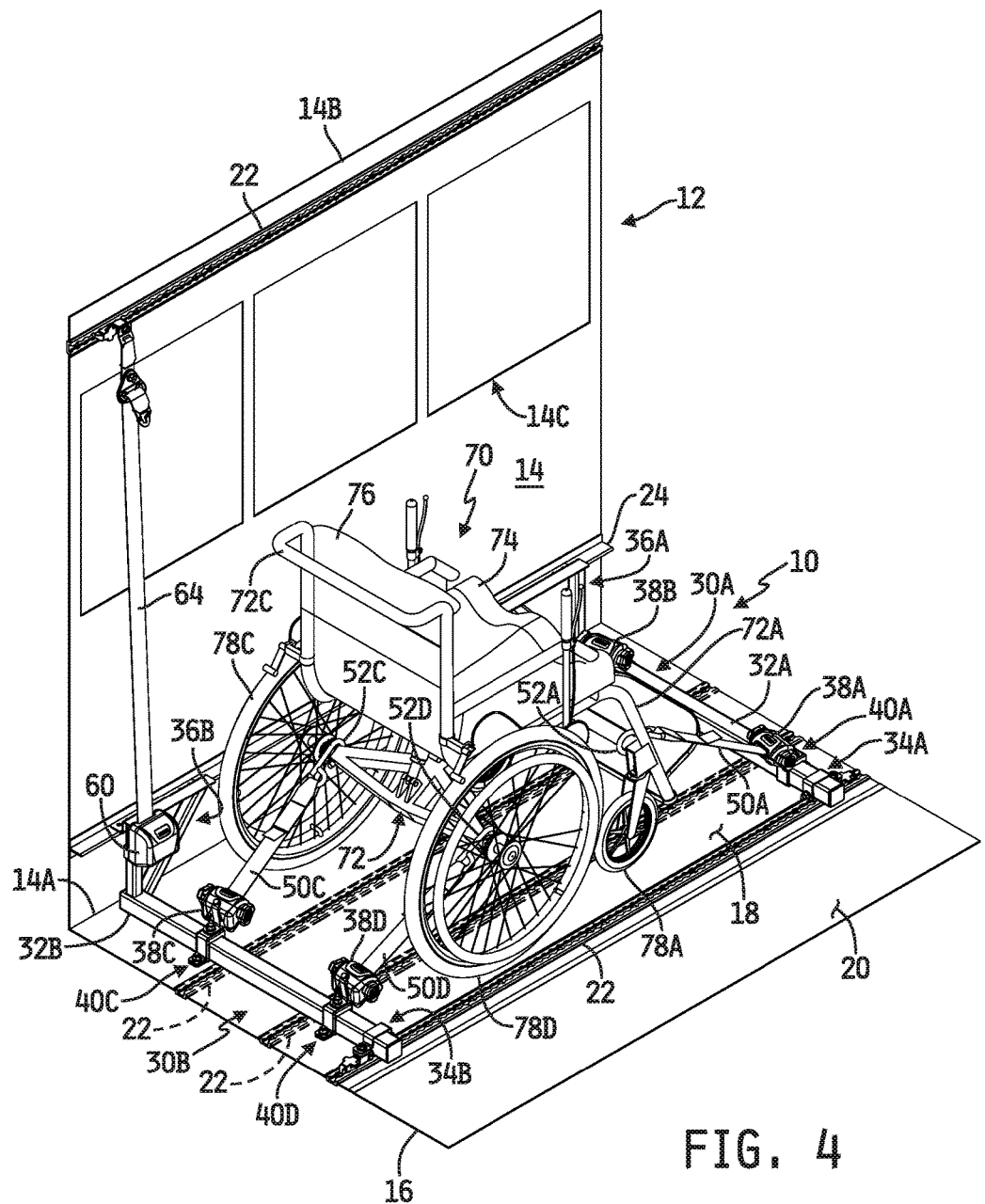
FIG. 4 is a perspective view of the apparatus of FIGS. 1-3C shown from the same perspective as that of FIG. 1 and illustrating the apparatus coupled to a wheelchair positioned between the occupant seat mounting tracks.
Figure 5:
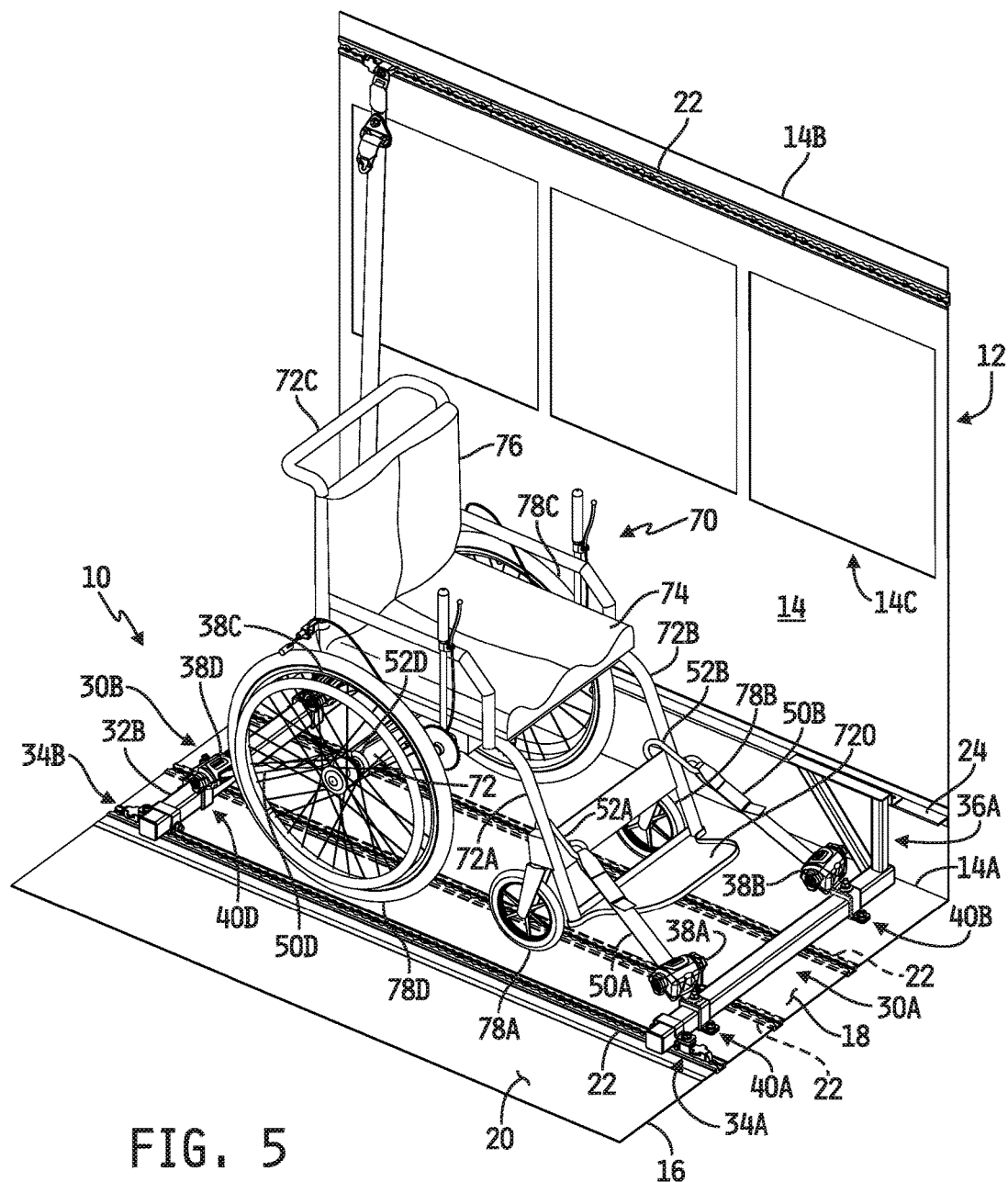
FIG. 5 is a perspective view of the apparatus of FIGS. 1-4 shown from the same perspective as that of FIG. 2 and further illustrating the apparatus coupled to the wheelchair positioned between the occupant seat mounting tracks.

Referring now to FIGS. 4 and 5, the wheelchair securement device mounting apparatus 10 is shown with the wheelchair securement devices 38A-38C coupled or attached to a wheelchair 70 positioned within the space 18 between the two vehicle seat mounting tracks 22, 24. In the illustrated embodiment, the wheelchair 70 is a conventional wheelchair having a base frame 72 which generally supports an axle and a seat bottom 74 of the wheelchair 70. The base frame 72 is illustratively coupled to or integral with wheel-supporting frame components 72A, 72B coupled to a footrest 72O. In some embodiments, the footrest 72O is a unitary footrest as illustrated in FIGS. 4 and 5, although in alternate embodiments the footrest 72O may include separate footrests to support each of the occupant's right and left feet. In any case, a right front wheel 78A is operatively coupled to the frame component 72A between the footrest 72O and the seat bottom 74 on the right side of the wheelchair 70, and a left front wheel 78B is operatively coupled to the frame component 72B between the footrest 72O and the seat bottom 74 on the left side of the wheelchair. A left rear wheel 78C is operatively coupled to the base frame 72 on the left side of the wheelchair 70, and a right rear wheel 78D is operatively coupled to the base frame 72 on the right side of the wheelchair 70.

As illustrated in FIGS. 4 and 5, the wheelchair securement devices 38A-38D are each secured to and between the wheelchair 70 and the wheelchair securement assemblies 30A, 30B to thereby secure the wheelchair 70 to and within the occupant transport vehicle 12. The wheelchair securement devices 38A-38C are secured to the wheelchair 70 by first introducing slack into each of the webs 50A, 50B, 50C and 50D, e.g., via manual actuation of the web retracting/payout actuators, then securing the wheelchair securement devices 38A-38C to the wheelchair 70, and then tightening the webs 50A-50D, e.g., again via manual actuation of the web retracting/payout actuators. In the illustrated embodiment, the wheelchair securement device 38A is coupled to the wheelchair 70 by coupling the wheelchair engagement member 52A to the frame component 72A, the wheelchair securement device 38B is coupled to the wheelchair 70 by coupling the wheelchair engagement member 52B to the frame component 72B, the wheelchair securement device 38C is coupled to the wheelchair 70 by coupling the wheelchair engagement member 52C to the base frame 72 adjacent to the left rear wheel 78C and the wheelchair securement device 38D is coupled to the wheelchair 70 by coupling the wheelchair engagement member 52D to the base frame 72 adjacent to the right rear wheel 78D. In some embodiments, only one wheelchair securement device may be coupled to the front portion of the wheelchair 70, and in such embodiments the wheelchair securement device 38A or 38B may be omitted.

As illustrated by in FIGS. 4 and 5, the wheelchair securement device mounting apparatus 10 advantageously eliminates the need to install additional vehicle seat mounting tracks inboard of the existing vehicle seat mounting tracks 22, 24, e.g., the example inboard tracks 22 shown by dashed-line representation, for mounting wheelchair securement devices directly thereto as in conventional wheelchair securement systems. Moreover, in embodiments in which the wheelchair securement devices 38A-38D are movably positionable along the respective elongated support members 32A, 32B as described above, each wheelchair securement device 38A-38D may further advantageously be positioned directly in line with the frame component of the wheelchair 70 with which the corresponding wheelchair engagement member 52A-52D is to be engaged, or positioned so as to facilitate engagement of one or more of the wheelchair engagement members 52A-52D with corresponding selected or desired frame components of the wheelchair 70.

In some embodiments, as illustrated by example in the wheelchair securement device mounting apparatus 10' of FIGS. 6A and 6B, a wheelchair occupant restraint system 80 may be coupled to the wheelchair securement assembly 30B, wherein the wheelchair occupant restraint system 80 is configured to engage an occupant of the wheelchair 70 and restrain the occupant relative to the wheelchair 70 in a conventional manner. In the illustrated embodiment, the wheelchair restraint system 80 includes a pair of lap restraint webs 90, 100 coupled to the wheelchair securement devices 38C, 38D respectively, and in such embodiments the wheelchair securement devices 38C, 38D each include the web attachment bracket 48A described above with respect to FIG. 3C. As most clearly shown in the magnified view of FIG. 6B, one end of the lap restraint web 100 is coupled to a web mounting plate or bracket 102 which defines a slot 103 therethrough configured to engage the post 48B to secure the plate or bracket 102 to the wheelchair securement device 38D on a conventional manner. The lap restraint web 90 is illustratively identically secured to the wheelchair securement device 38C.

In the illustrated embodiment, a tongue member 94 is coupled to the opposite end of the lap restraint web 90, and a buckle member 104 is coupled to the opposite end of the lap restraint web 100. In alternate embodiments, the tongue member 94 may be coupled to the lap restraint web 100 and the buckle member 104 may be coupled to the lap restraint web 90. In any case, the tongue and buckle members 94, 104 are illustratively configured in a conventional manner to releasably engage each other. Conventional web length adjustment devices 98, 108 may illustratively be implemented in line with either or both of the lap restraint webs 90, 100 respectively.

In some embodiments in which the wheelchair occupant restraint system 80 is coupled to the wheelchair securement assembly 30B, the wheelchair securement assembly 30B may further include a shoulder web assembly as illustrated by example in FIGS. 1, 2 and 6A. In the illustrated embodiments, the wheelchair securement assembly 30B illustratively includes a conventional web retractor 60 attached to the anchor device 36B, e.g., to the riser portion of the anchor device 36B, via a suitable retractor mounting bracket 62. One end of a shoulder web 64 is coupled to the web retractor, and an opposite end loops through a slot 68 defined through a web guide 66 positioned upwardly along the sidewall 14, e.g., above a shoulder of an occupant seated in the wheelchair 70 but below the top 14A of the sidewall 14. The free end of the shoulder web 64 is attached to a tongue member 70 defining a slot 72 therethrough. The retractor 60 is illustratively a conventional locking retractor configured to retract and payout the web 64 under non-locked conditions and to prevent payout of the web 64 under locked conditions.

In the illustrated embodiment, the web guide 66 is coupled to a bracket 76A attached to one end of a web 74, and an opposite end of the web 74 is attached to another bracket 76B coupled to an anchor 37, e.g., of the type illustrated and described with respect to FIG. 3A. A vehicle seat track 22, e.g., as illustrated and described with respect to FIGS. 1, 2 and 3A, or similar such track is illustratively mounted to the sidewall 14 at or near the top 14A thereof and generally parallel with the track 24, as illustrated in FIGS. 1, 2 and 6A. The anchor 37 is selectively coupled to and along the vehicle seat track 22 mounted at or near the top 14A of the sidewall 14 to position the anchor 37 generally above the retractor 60 as shown.

In embodiments of the wheelchair securement device mounting apparatus 10' which include the wheelchair occupant restraint system 80 and which include the shoulder web assembly just described, e.g., as illustrated in FIG. 6A, the tongue member 94 coupled to the lap web 90 illustratively has a post or stud 96 mounted thereto, and the slot 72 defined through the tongue member 70 coupled to the shoulder web 64 is operatively configured to releasably engage the post 96 to secure the tongue member 70 of the shoulder restraint web 64 to the tongue member 94 of the lap restraint web 90. In other embodiments of wheelchair securement device mounting apparatus, e.g., such as the embodiment 10 described above, in which the wheelchair occupant restraint system 80 is not included, some wheelchairs used with the apparatus 10 may have an occupant restraint harness carried thereby and coupled thereto. In such embodiments, the shoulder web assembly just described may be included, e.g., as illustrated in FIGS. 1 and 2. In such embodiments, the occupant restraint harness carried by the wheelchair illustratively includes one or more structures, e.g., identical or similar to the tongue 94/post 96 coupled to the lap web restraint 90, operatively configured to releasably engage the slot 72 defined through the tongue member 70, such that the tongue member 70 coupled to the shoulder web restraint 64 may be selectively secured to the occupant restraint harness carried by the wheelchair.

Figure 7:
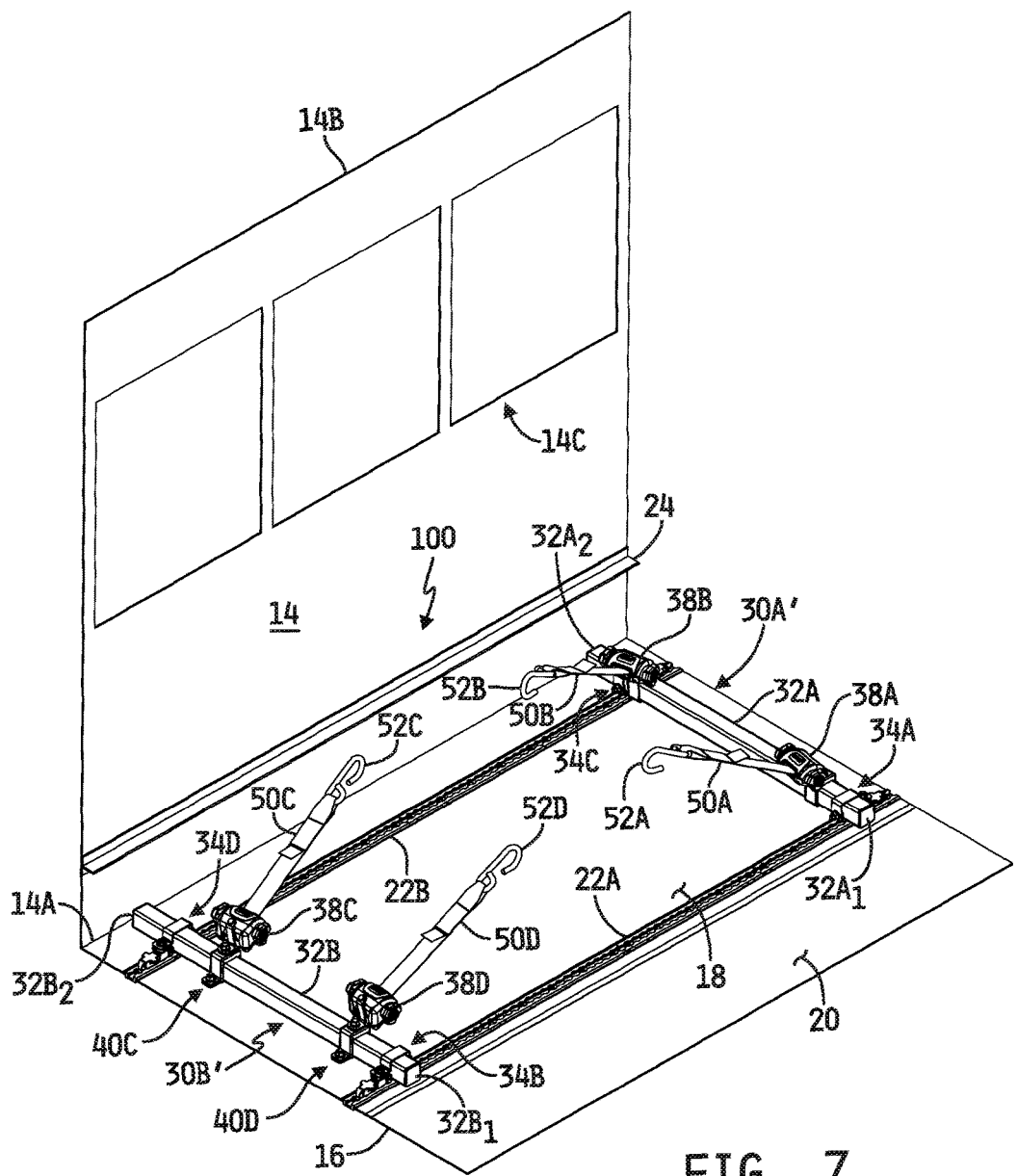
FIG. 7 is a perspective view of yet another embodiment of an apparatus for mounting wheelchair securement devices to existing vehicle seat mounting tracks, wherein the perspective view illustrated in FIG. 7 the same as that illustrated in FIG. 1.

Referring now to FIG. 7, another embodiment is shown of an apparatus 100 for mounting wheelchair securement devices to existing vehicle seat mounting tracks. In the embodiment illustrated in FIG. 7, the existing vehicle seat mounting tracks are implemented in the form of two spaced-apart vehicle seat mounting tracks 22A and 22B. The vehicle seat mounting track 22A is illustratively identical in structure and function to the vehicle seat mounting track 22 mounted to the floor 16 as illustrated in FIGS. 1-6A and described in detail above. The vehicle seat mounting track 22B is illustratively identical to the vehicle seat mounting track 22A and is likewise mounted to the floor 16 of the vehicle 12. In such embodiments, the vehicle seat mounting track 22B illustratively replaces the vehicle seat mounting track 24 illustrated and described with respect to FIGS. 1-6A. The vehicle seat mounting track 22B, like the vehicle seat mounting track 22A, illustratively includes a number of bores or wells configured to engage a conventional seat mounting post or stud affixed to or integral with a base frame or leg of a conventional occupant seat such that the occupant seat is secured to the tracks 22A and 22B in a conventional manner.

In the embodiment illustrated in FIG. 7, a modified wheelchair securement assembly 30A' includes an anchor device 34C, illustratively identical to the anchor devices 34A, 34B described above, in place of the anchor device 36A. Likewise, a modified wheelchair securement assembly 30B' includes an anchor device 34D, also illustratively identical to the anchor devices 34A, 34B described above, in place of the anchor device 36A. The anchor devices 34A, 34B are used, as described above, to secure the elongated support member 32A to the spaced-apart vehicle seat mounting tracks 22A, 22B, and the anchor devices 34C, 34D are likewise used, as described above, to secure the elongated support member 32B to the spaced-apart vehicle seat mounting tracks 22A, 22B such that the elongated support members 32A, 32B are spaced apart sufficiently to accommodate a wheelchair positioned therebetween.

It will be understood that this disclosure contemplates alternate embodiments which may include any combination of the structural components described with respect to the various illustrated embodiments. In one alternate embodiment, for example, the apparatus 100 may include a shoulder web assembly as illustrated in FIGS. 1, 2 and 6A. In some such embodiments, the web retractor 60 may be mounted directly to the elongated support member 32B, e.g., via suitable bracket or clamp, and in other such embodiments a riser may be coupled to the elongated support member 32B at or near the end 32B$_2$ thereof, and the web retractor 60 may be mounted, e.g., via a suitable bracket or clamp, to such a riser. In still other such embodiments, the web retractor 60 may be mounted to the vehicle seat mounting rail 24 or directly to the sidewall 14, e.g., via suitable bracket or clamp.

In another alternate embodiment, a wheelchair securement device mounting apparatus may be formed of a combination of the wheelchair securement apparatus 30A' illustrated in FIG. 7 and the wheelchair securement apparatus 30B illustrated in FIGS. 1-6A. In still another embodiment, a wheelchair securement device mounting apparatus may be formed of a combination of the wheelchair securement apparatus 30A illustrated in FIGS. 1-6A and the wheelchair securement apparatus 30B' illustrated in FIGS. 7. In still other alternate embodiment, a shoulder web assembly, e.g., as illustrated in FIGS. 1, 2 and 6A, may be coupled to any of the wheelchair securement apparatus 30A, 30B, 30A', 30B' in any embodiment of the wheelchair securement device mounting apparatus illustrated and/or described herein.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected.

What is claimed is:

1. An apparatus for mounting at least one wheelchair securement device to a pair of spaced-apart vehicle seat mounting structures configured for mounting at least one occupant seat thereto, each of the vehicle seat mounting structures secured to and within an occupant transport vehicle and extending in a direction parallel to a direction of travel of the occupant transport vehicle, the apparatus comprising:
    a first elongated support member extending transversely along a floor of the occupant transport vehicle between the pair of spaced-apart vehicle seat mounting structures,
    a first anchor coupled to the first elongated support member at or near one end thereof and releasably attachable to one of the pair of spaced-apart vehicle seat mounting structures provided in the form of an elongated vehicle seat mounting track secured to a floor of the occupant transport vehicle,
    a second anchor coupled to the first elongated support member at or near an opposite end thereof and releasably attachable to the other of the pair of spaced-apart vehicle seat mounting structures provided in the form of an elongated vehicle seat mounting rail secured to a wall of the occupant transport vehicle and spaced apart from the floor of the occupant transport vehicle, and
    a first wheelchair securement device secured to the first elongated support member between the first and second anchors.

2. The apparatus of claim 1, wherein the first anchor comprises:
    a collar secured to the first elongated support member at or adjacent to the one end thereof, and
    a track engagement anchor secured to the collar and releasably attachable to the vehicle seat mounting track.

3. The apparatus of claim 1, wherein the second anchor comprises a bracket secured at or adjacent to the floor of the occupant transport vehicle to the first elongated support member at or adjacent to the opposite end thereof, the bracket including a rail mounting portion releasably attachable to the elongated vehicle seat mounting rail.

4. The apparatus of claim 3, further comprising a first wheelchair securement web having one end attached to the first wheelchair securement device and an opposite end attached to a wheelchair engagement member releasably engageable with a wheelchair.

5. The apparatus of claim 3, wherein the bracket includes a riser portion extending between the first elongated support member and the rail mounting portion thereof,
    and wherein the apparatus further comprises a restraint retractor secured to the riser portion of the bracket, and a web having one end coupled to the restraint retractor and an opposite end configured for releasable attachment to a wheelchair occupant restraint harness.

6. The apparatus of claim 1, further comprising a second wheelchair securement device secured to the first elongated support member between the first wheelchair securement device and one of the first and second anchors.

7. The apparatus of claim 6, further comprising:
    a first wheelchair securement web having one end attached to the first wheelchair securement device and an opposite end attached to a first wheelchair engagement member releasably engageable with a wheelchair, and
    a second wheelchair securement web having one end attached to the second wheelchair securement device and an opposite end attached to a second wheelchair engagement member releasably engageable with the wheelchair.

8. The apparatus of claim 1, further comprising:
    a second elongated support member extending transversely along the floor of the occupant transport vehicle between the elongated vehicle seat mounting track and the elongated vehicle seat mounting rail, the second elongated support member spaced apart from the first elongated support member,
    a third anchor coupled to the second elongated support member at or near one end thereof and releasably attachable to the elongated vehicle seat mounting track,
    a fourth anchor coupled to the second elongated support member at or near an opposite end thereof and releasably attachable to the elongated vehicle seat mounting rail, and a second wheelchair securement device secured to the second elongated support member between the third and fourth anchors.

9. The apparatus of claim 8, further comprising a third wheelchair securement device secured to the first elongated support member between the first wheelchair securement device and one of the first and second anchors.

10. The apparatus of claim 9, further comprising a fourth wheelchair securement device secured to the second elongated support member between the second wheelchair securement device and one of the third and fourth anchors.

11. The apparatus of claim 1, further comprising:
means for slidably mounting the first wheelchair securement device to the first elongated support member such that the first wheelchair securement device is slidable along the first elongated support member, and
means for securing the first wheelchair securement device to the first elongated support member at a selected position of the first wheelchair securement device relative to the first elongated support member between the first and second anchors.

12. The apparatus of claim 11, further comprising:
a second wheelchair securement device means for slidably mounting the second wheelchair securement device to the first elongated support member such that the second wheelchair securement device is slidable along the first elongated support member,
means for securing the second wheelchair securement device to the first elongated support member at a selected position of the second wheelchair securement device relative to the first elongated support member between the first wheelchair securement device and one of the first and second anchors.

13. The apparatus of claim 11, further comprising:
a second elongated support member extending transversely along the floor of the occupant transport vehicle between the elongated vehicle seat mounting track and the elongated vehicle seat mounting rail, the second elongated support member spaced apart from the first elongated support member,
a third anchor coupled to the second elongated support member at or near one end thereof and releasably attachable to one of the pair of spaced-apart vehicle seat mounting structures,
a fourth anchor coupled to an opposite end of the second elongated support member and releasably attachable to the elongated vehicle seat mounting track,
a second wheelchair securement device,
means for slidably mounting the second wheelchair securement device to the second elongated support member such that the second wheelchair securement device is slidable along the second elongated support member, and
means for securing the second wheelchair securement device to the second elongated support member at a selected position of the second wheelchair securement device relative to the second elongated support member between the third and fourth anchors.

14. The apparatus of claim 13, further comprising:
a third wheelchair securement device,
means for slidably mounting the third wheelchair securement device to the first elongated support member such that the third wheelchair securement device is slidable along the first elongated support member,
means for securing the third wheelchair securement device to the first elongated support member at a selected position of the third wheelchair securement device relative to the first elongated support member between the first wheelchair securement device and one of the first and second anchors,
a fourth wheelchair securement device,
means for slidably mounting the fourth wheelchair securement device to the second elongated support member such that the fourth wheelchair securement device is slidable along the second elongated support member, and
means for securing the fourth wheelchair securement device to the second elongated support member at a selected position of the fourth wheelchair securement device relative to the second elongated support member between the third wheelchair securement device and one of the third and fourth anchors.

15. The apparatus of claim 1, wherein the first wheelchair securement device is secured to the first elongated support member in a fixed position relative to the first elongated support member.

16. An apparatus for mounting at least one wheelchair securement device to existing first and second elongated and spaced-apart vehicle seat mounting tracks integral with or mounted to a floor of an occupant transport vehicle and designed to mount and secure one or more occupant seats thereto, the first and second elongated vehicle seat mounting tracks each extending along the floor of the occupant transport vehicle in a direction parallel to a direction of travel thereof, the apparatus comprising:
a first elongated support member extending transversely along a floor of the occupant transport vehicle between the first and second elongated vehicle seat mounting tracks,
a first anchor coupled to the first elongated support member at or near one end thereof and releasably attachable to the first elongated vehicle seat mounting track,
a second anchor coupled to the first elongated support member at or near an opposite end thereof and releasably attachable to the second elongated vehicle seat mounting track,
at least one of the first and second anchors including a bracket longitudinally translatable along the first elongated support member, and at least one fixation member configured to cooperate with the bracket to secure the bracket to the first elongated support member at a selected position of the bracket relative to the first elongated support member, and
a first wheelchair securement device secured to the first elongated support member between the first and second anchors, the first wheelchair securement device including a first restraint web having a first wheelchair engagement member coupled to one end thereof, a first housing carrying a first spool about which the first restraint web is wound, and at least a first actuator via which the first restraint web is retracted into and paid out of the first housing.

17. The apparatus of claim 16, further comprising a second wheelchair securement device secured to the first elongated support member between the first wheelchair securement device and one of the first and second anchors, the second wheelchair securement device including a second restraint web having a second wheelchair engagement member coupled to one end thereof, a second housing carrying a second spool about which the second restraint web is wound, and at least a second actuator via which the second restraint web is retracted into and paid out of the second housing.

18. The apparatus of claim 16, further comprising:
means for slidably mounting the first wheelchair securement device to the first elongated support member such that the first wheelchair securement device is slidable along the first elongated support member, and
means for securing the first wheelchair securement device to the first elongated support member at a selected position of the first wheelchair securement device relative to the first elongated support member between the first and second anchors.

19. The apparatus of claim 16, wherein the first wheelchair securement device is secured to the first elongated support member in a fixed position relative to the first elongated support member.

20. An apparatus for mounting at least one wheelchair securement device to existing first and second elongated and spaced-apart vehicle seat mounting tracks integral with or mounted to a floor of an occupant transport vehicle and designed to mount and secure one or more occupant seats thereto, the first and second elongated vehicle seat mounting tracks each extending along the floor of the occupant transport vehicle in a direction parallel to a direction of travel thereof, the apparatus comprising:

- a first elongated support member extending transversely along a floor of the occupant transport vehicle between the first and second elongated vehicle seat mounting tracks,
- a first anchor coupled to the first elongated support member at or near one end thereof and releasably attachable to the first elongated vehicle seat mounting track,
- a second anchor coupled to the first elongated support member at or near an opposite end thereof and releasably attachable to the second elongated vehicle seat mounting track,
- a first wheelchair securement device including a first restraint web having a first wheelchair engagement member coupled to one end thereof, a first housing carrying a first spool about which the first restraint web is wound, and at least a first actuator via which the first restraint web is retracted into and paid out of the first housing,
- a second wheelchair securement device including a second restraint web having a second wheelchair engagement member coupled to one end thereof, a second housing carrying a second spool about which the second restraint web is wound, and at least a second actuator via which the second restraint web is retracted into and paid out of the second housing, means for slidably mounting the first wheelchair securement device to the first elongated support member between the first and second anchors such that the first wheelchair securement device is slidable along the first elongated support member, means for slidably mounting the second wheelchair securement device to the first elongated support member between the first wheelchair securement device and the second anchor such that the second wheelchair securement device is slidable along the first elongated support member, means for securing the first wheelchair securement device to the first elongated support member at a first selected position of the first wheelchair securement device relative to the first elongated support member between the first anchor and the second wheelchair securement device, and means for securing the second wheelchair securement device to the first elongated support member at a second selected position of the second wheelchair securement device relative to the first elongated support member between the first wheelchair securement device and the second anchor.

\* \* \* \* \*